(12) United States Patent
Ooiwa

(10) Patent No.: US 6,822,362 B2
(45) Date of Patent: Nov. 23, 2004

(54) ROTARY ELECTRIC MACHINE

(75) Inventor: Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 09/935,695

(22) Filed: Aug. 24, 2001

(65) Prior Publication Data

US 2002/0047445 A1 Apr. 25, 2002

(30) Foreign Application Priority Data

Aug. 25, 2000 (JP) .......................................... 2000-255592

(51) Int. Cl.⁷ ............................. H02K 3/30; H02K 3/32; H02K 3/34
(52) U.S. Cl. ..................... 310/179; 310/58; 174/120 R; 174/121 R
(58) Field of Search ................................. 310/179, 180, 310/184, 201, 263, 52, 58; 174/120 R, 121 R

(56) References Cited

U.S. PATENT DOCUMENTS

| | | | | |
|---|---|---|---|---|
| 1,830,456 A | * | 11/1931 | Apple | .......................... 310/201 |
| 3,428,486 A | * | 2/1969 | George | .......................... 428/383 |
| 4,616,407 A | * | 10/1986 | Tamaki et al. | ................. 29/596 |
| 5,405,665 A | * | 4/1995 | Shukushima et al. | ....... 428/34.9 |
| 5,712,517 A | * | 1/1998 | Schmidt et al. | ................ 310/45 |
| 5,917,155 A | * | 6/1999 | Hake et al. | .............. 174/120 R |
| 5,936,326 A | * | 8/1999 | Umeda et al. | ............... 310/179 |
| 5,998,903 A | | 12/1999 | Umeda et al. | ............... 310/179 |
| 6,100,474 A | * | 8/2000 | McGregor et al. | ....... 174/110 R |
| 6,147,432 A | * | 11/2000 | Kusase et al. | .............. 310/260 |
| 6,403,890 B1 | * | 6/2002 | McGregor et al. | ....... 174/120 R |
| 6,700,236 B2 | * | 3/2004 | Umeda et al. | ................. 310/54 |

* cited by examiner

Primary Examiner—Thanh Lam
Assistant Examiner—David W. Scheuermann
(74) Attorney, Agent, or Firm—Oliff & Berridge, PLC

(57) ABSTRACT

A rotary electric machine has a stator winding made of a plurality of segments. The segments comprises a plurality of regular segments regularly arranged to provide a part of the stator winding and irregular segments disposed to provide a remaining part of the stator winding. The regular segments are covered with a polyester-imide. The irregular segments are covered with a polyamide-imide that provides a higher insulation performance than the polyester-imide. Therefore, it is possible reduce an amount of the polyamide-imide to ensure an insulation relating to the irregular segments.

10 Claims, 11 Drawing Sheets

ROTARY ELECTRIC MACHINE

CROSS REFERENCE TO RELATED APPLICATION

This application is based on Japanese Patent Application No. 2000-255592 filed on Aug. 25, 2000, the contents of which are incorporated herein by reference.

BACKGROUND OF THE INVENTION

1. Field of the Invention

The present invention relates to a rotary electric machine.

2. Description of Related Art

JP-B-2927288 discloses an alternator for vehicle as a rotary electric machine, which has a plurality of segments and a plurality of joining portions between the segments. In this arrangement, although almost all of the segments are regularly arranged on a stator core, a few segments are irregularly arranged and provide irregular connections and leads. These irregular segments might be more stressful, easier damaged, or worn down, as compared to the regularly arranged segments.

SUMMARY OF THE INVENTION

One aspect of the present invention addresses these drawbacks by providing an improved arrangement of a rotary electric machine.

According to a first embodiment of the present invention, a stator winding has a plurality of segments. The segments comprise a plurality of regular segments regularly arranged to provide a part of the stator winding and an irregular segment disposed to provide a remaining part of the stator winding. The segments are covered with insulating layers that comprise a first insulating layer covering a first surface of the segments and a second insulating layer covering a second surface of the segments. The second insulating layer has a higher insulation performance than the first insulating layer. The second surface, which is covered with the second insulating layer, relates to an insulation to the irregular segment, and is smaller than the first surface. Therefore, it is possible to prevent a short circuit involving the irregular segments by using less material that provides the second insulating layer.

BRIEF DESCRIPTION OF THE DRAWINGS

These and other features and advantages of the present invention will be appreciated, as well as methods of operation and the function of the related parts, from a study of the following detailed description and the drawings, all of which form a part of this application. In the drawings.

DETAILED DESCRIPTION OF PREFERRED EMBODIMENTS

An alternator for a vehicle according to a first embodiment of the present invention is described with reference to the drawings.

Figure 1:
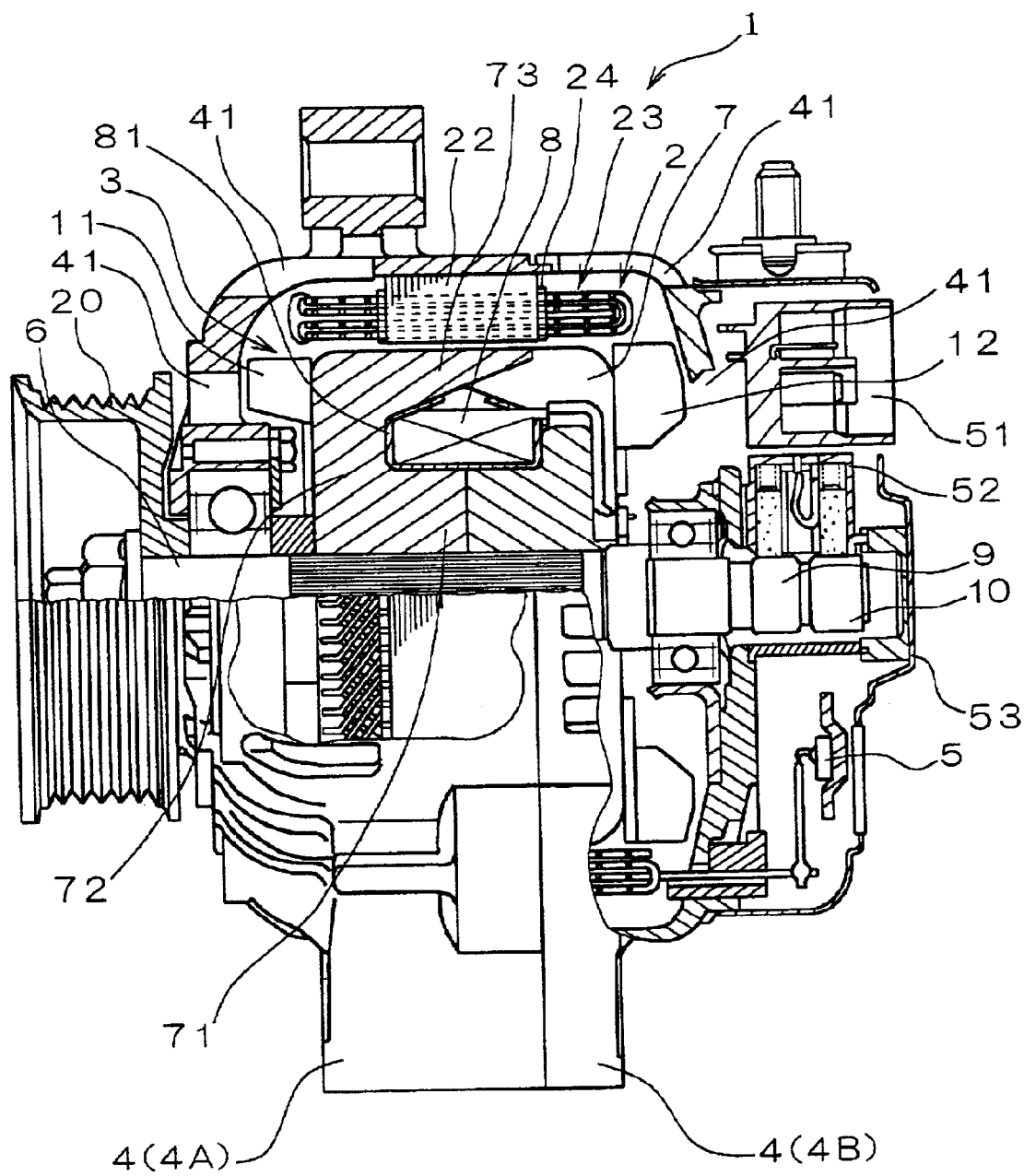
FIG. 1 is a cross sectional view of an alternator according to a first embodiment of the present invention.

Referring to FIG. 1, the alternator 1 has a stator 2, a rotor 3, a frame 4 and a rectifier 5.

Figure 3:
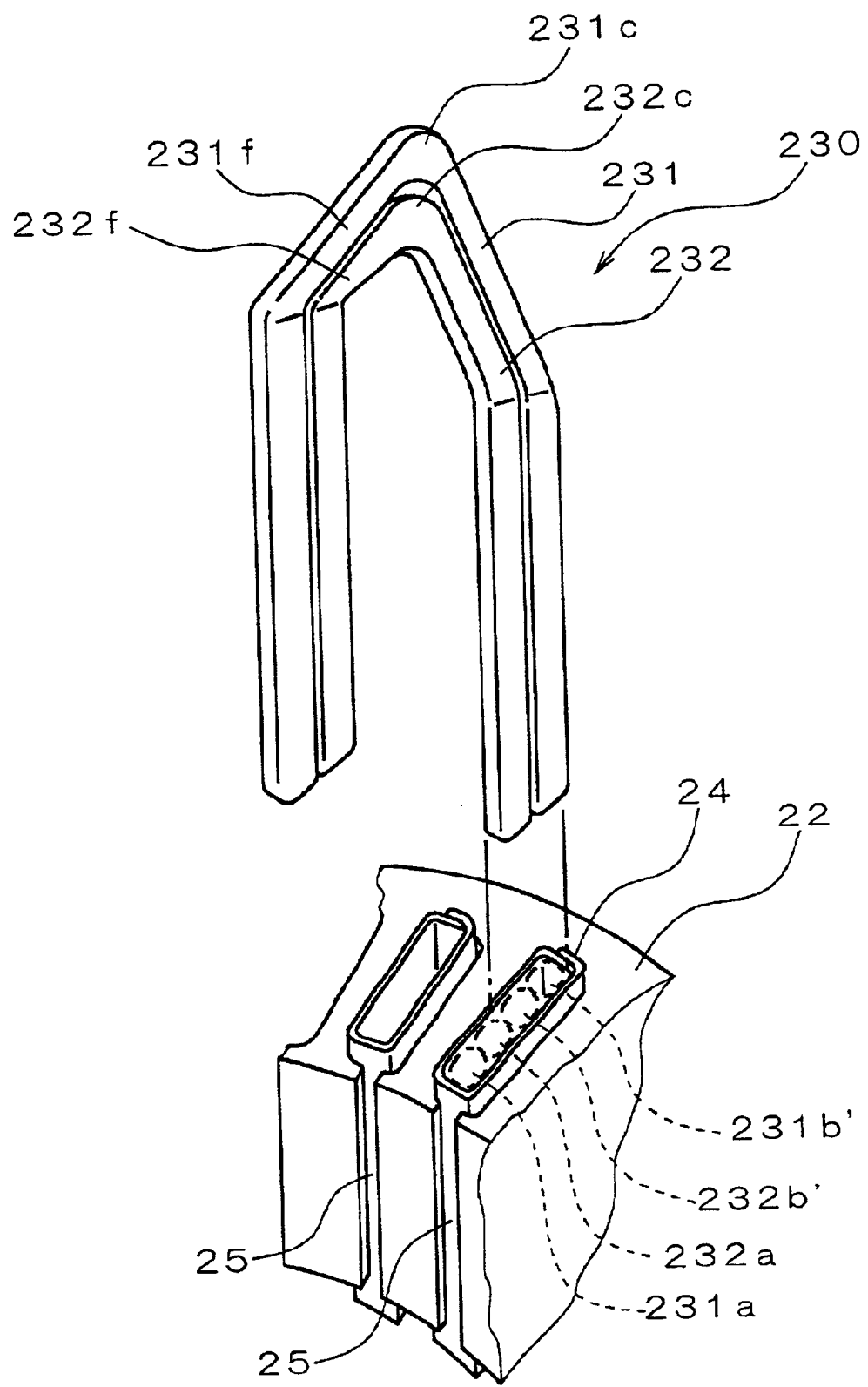
FIG. 3 is a perspective view showing an assembling step of the segments and a stator core according to the first embodiment of the present invention.

The stator 2 is supported and fixed on the frame 4. The stator 2 has a stator core 22, a stator winding 23 and insulators 24 insulating the stator winding 23 from the stator core 22. The stator core 22 is made of a laminated thin steel plate. The stator core 22 has a plurality of slots 25 as shown in FIG. 3, in this embodiment ninety-six slots are provided, which accommodate a part of the stator winding 23. The stator winding 23 is made of a plurality of segments 230 that have short U-shaped or I-shaped conductor wires joined to each other.

Figure 5:
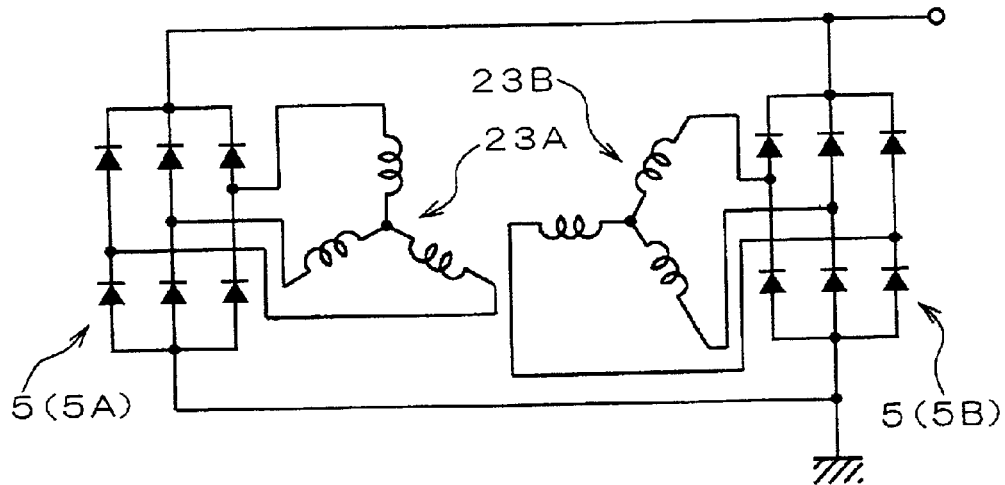
FIG. 5 is a circuit diagram of the alternator according to the first embodiment of the present invention.
Figure 6:
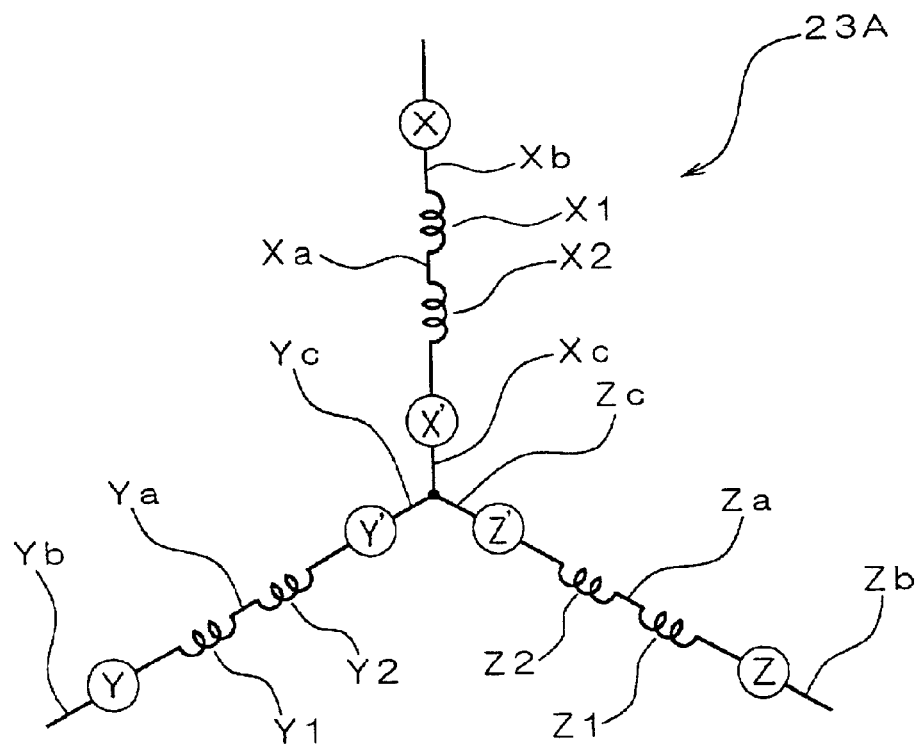
FIG. 6 is a circuit diagram of a three-phase winding according to the first embodiment of the present invention.
Figure 7:
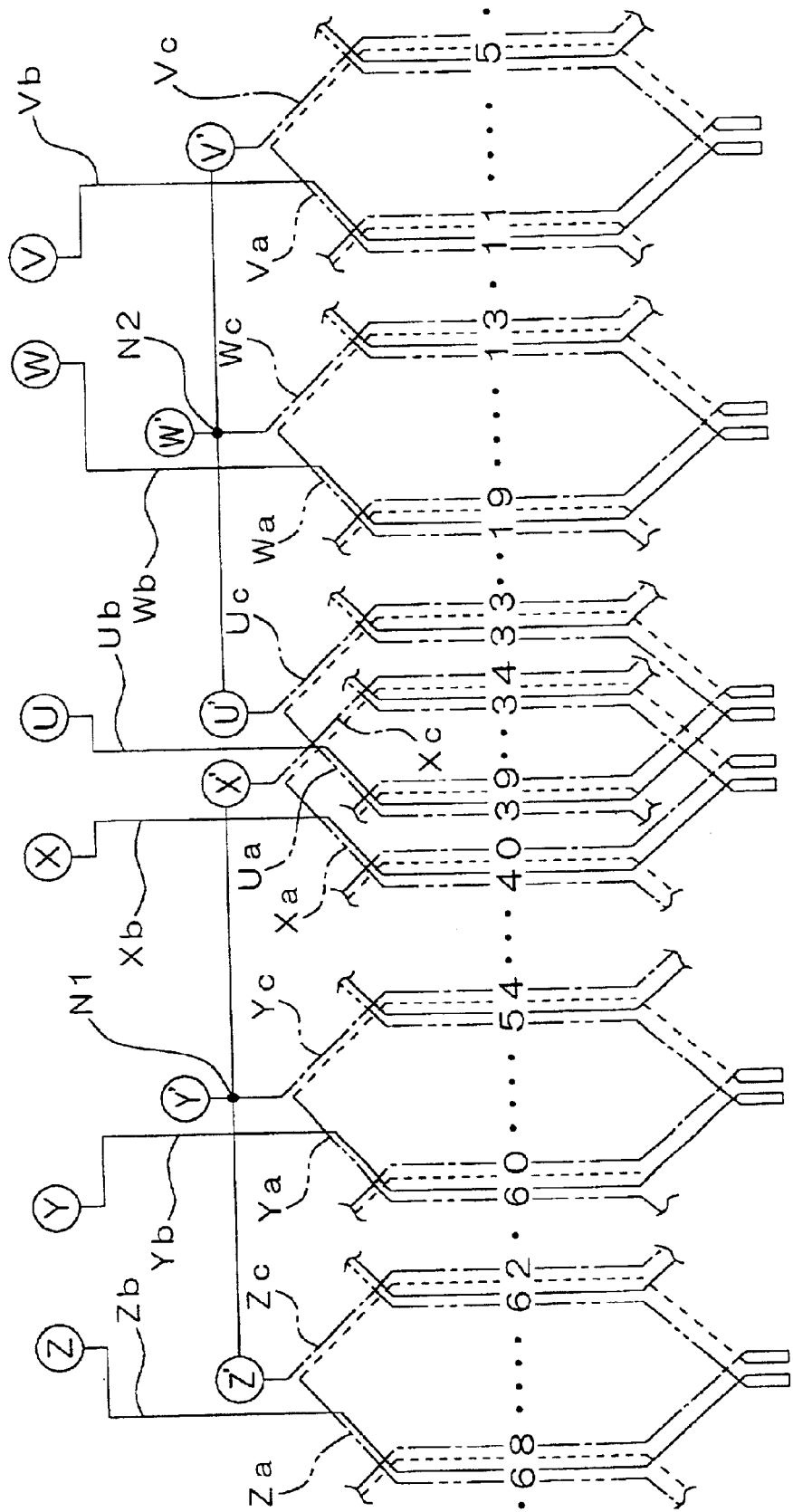
FIG. 7 is a wiring chart of a stator winding on the stator core according to the first embodiment of the present invention.
Figure 8:
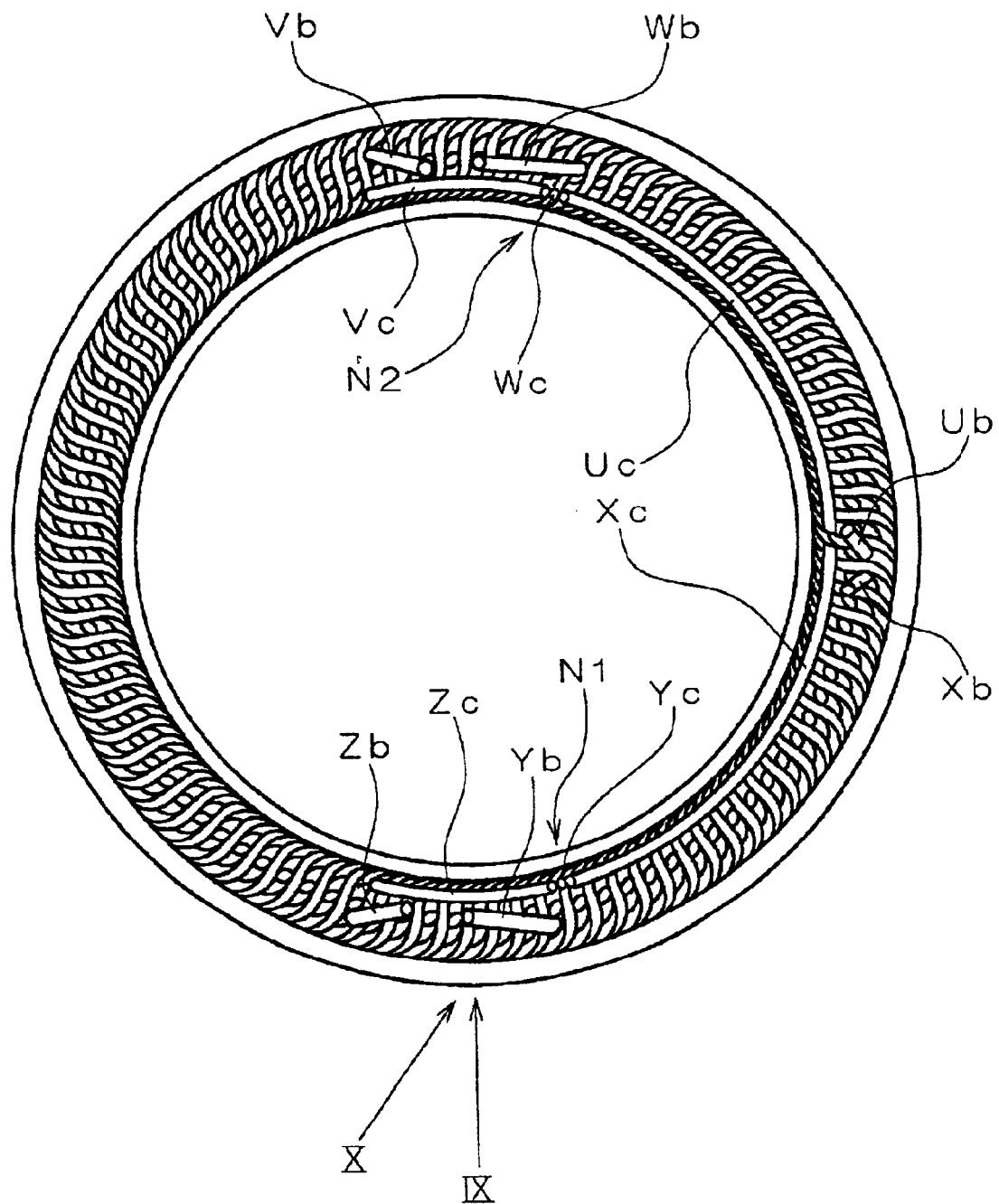
FIG. 8 is a plan view showing an arrangement of the segments on an axial end of the stator core according to the first embodiment of the present invention.

The stator winding 23 has a plurality of poly-phase windings. The stator winding 23 has two sets of three-phase windings 23A and 23B that are installed in different slots to shift 30 degrees as shown in FIG. 5. The three-phase winding 23A has star-connected X, Y and Z phase windings as shown in FIG. 6. The three-phase winding 23B has star-connected U, V and W phase windings, as shown in FIG. 7.

The rotor 3 is rotatable with a shaft 6. The rotor 3 has a Lundel type pole core 7, a field winding 8, slip rings 9 and 10, a mixed flow cooling fan 11 and a centrifugal cooling fan 12. The shaft 6 is rotatably supported by the frame 4 and supports a pulley 20.

The pole core 7 is made of a pair of cores. Each core has a cylindrical boss 71, a disc portion 72 and a plurality of magnetic claw poles 73. The cylindrical boss 71 is fixed on the shaft 6. The disc portion 72 extends radially from an axial end of the boss 71. The magnetic claw poles 73 extend axially from radial outermost portions of the disc portion 72. The cores are assembled to mesh the magnetic claw poles 73.

The field winding 8 is disposed in the pole core 7 and insulated from the cores by insulating paper 81. The insulating paper 81 is an impregnated sheet that covers the field winding 8 and is firmly fixed on the field winding 8 by a heating process.

The fan 11 is mounted on a front end of the pole core 7 by welding or the like. Likewise, the fan 12 is mounted on a rear end of the pole core 7. A projected area, projected in a rotating direction, of each blade of the fan 11 is smaller than that of the fan 12.

The frame 4 accommodates and supports the stator 2 and the rotor 3. The frame 4 has a front frame 4A and a rear frame 4B joined firmly each other by a plurality of through-bolts (not shown). The frame 4 has a plurality of windows 41 as air inlets and air outlets. The windows 41 located on both axial ends of the frame 4 work as the air inlets. The windows 41 located on a radial outside wall of the frame 4 in two rows work as the air outlet. Therefore, cooling wind flows on a surface of coil end portions of the stator winding 23.

Electric circuit members including the rectifier 5, a regulator 51 and a brush assembly 52 are mounted on a rear end of the rear frame 4B. The electric circuit members are protected by a cover 53. The rectifier 5 is connected with a plurality of leads extending from the stator winding 23. The rectifier 5 has a pair of three-phase full-wave rectifying circuits 5A and 5B corresponding to the three-phase windings 23A and 23B as shown in FIG. 5.

When the engine rotates the pulley 20, field current is supplied to the field winding 8. The rotor 3 rotates and generates rotating magnetic field to induce an AC current on the stator winding 23. The induced power is rectified and supplied as a DC power through the output terminal of the rectifier 5. The fans 11 and 12 generate cooling wind from the inlets 41 to the outlets 41.

In this embodiment, the stator winding 23 is made of plurality of segments 230. Each of the segments 230 is a short copper wire with an insulating layer, which only provides a part of the stator winding 23 corresponding to one or half of a magnetic pole pitch.

Figure 11:
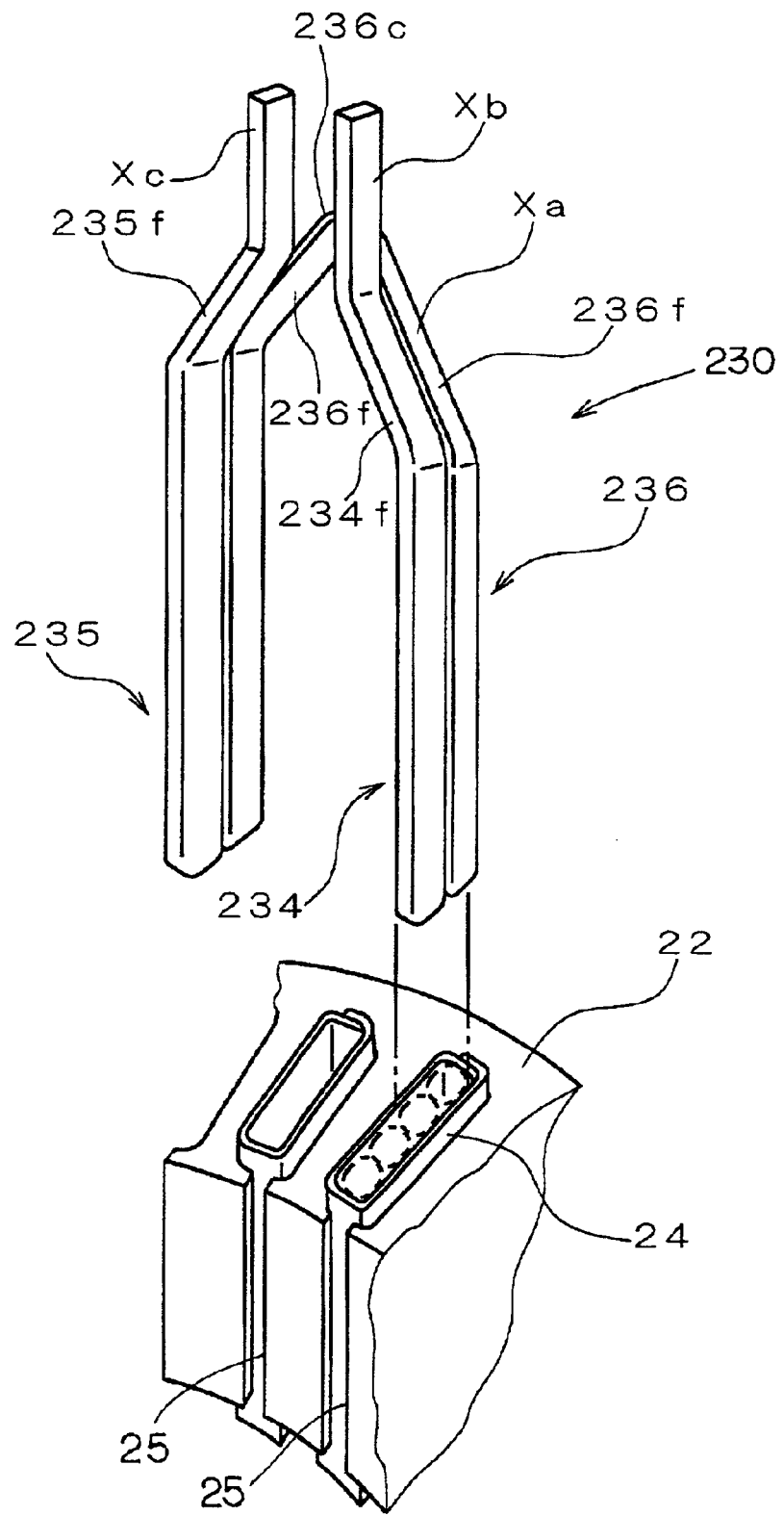
FIG. 11 is a perspective view showing an assembling step of irregular segments and the stator core according to the first embodiment of the present invention.

Referring to FIGS. 3 and 11, each of the slots 25 accommodates a plurality of conductors provided by the segments 230. Each of the slots 25 accommodates an even numbers, e.g., four, of conductors arranged in a radial direction. These conductors provide an inner most layer, an inner middle layer, an outer middle layer and an outer most layer in one of the slots 25.

Figure 2:
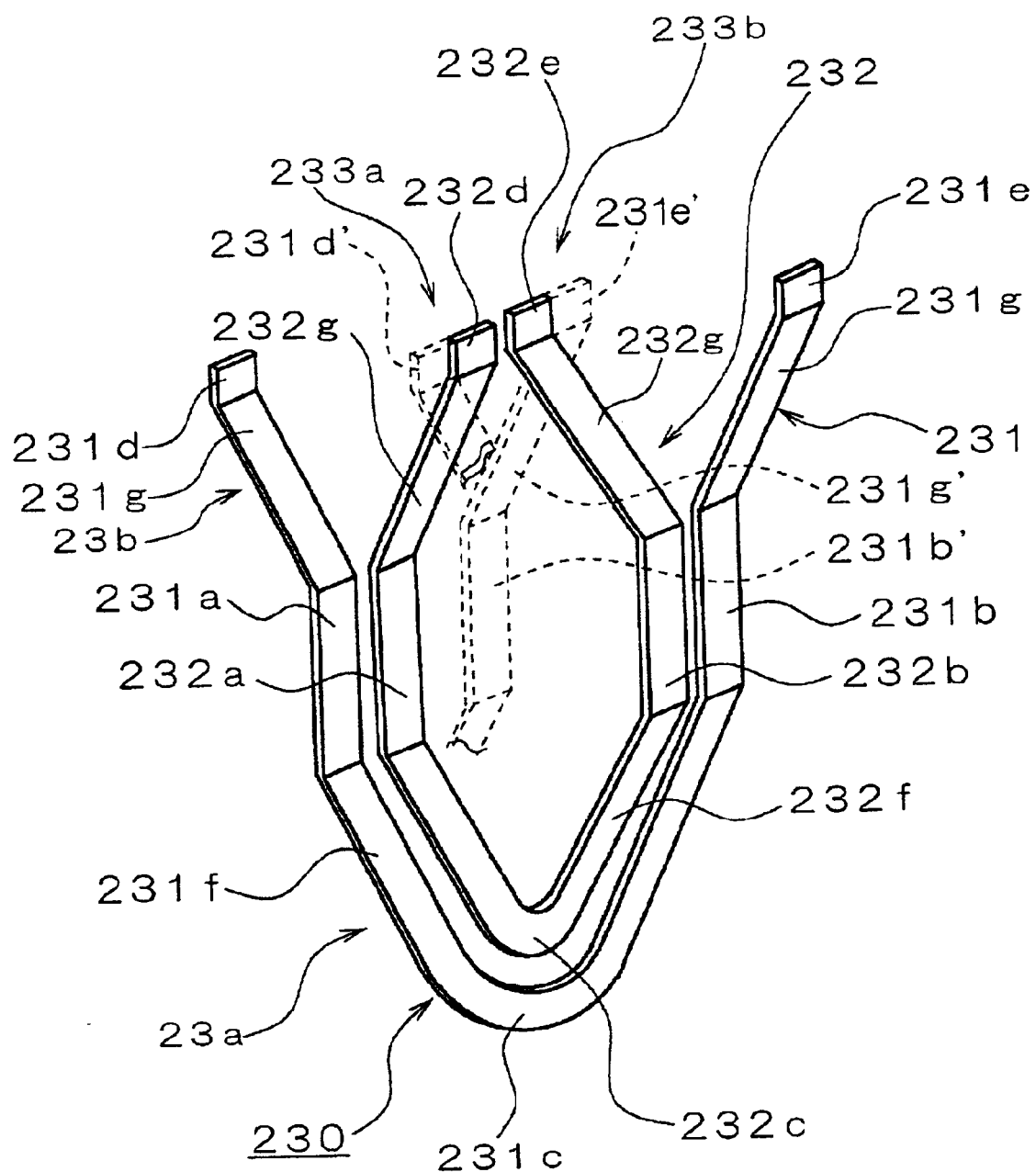
FIG. 2 is a perspective view of segments according to the first embodiment of the present invention.

The segments 230 include major segments as regular segments and minor segments as irregular segments. The major segments include large segments 231 and small segments 232, which are regularly arranged on the stator core 22 for providing a main part of the stator winding 23 as shown in FIG. 2. The minor segments include lead segments 234 and 235 for providing output leads and a neutral connection leads extending beyond a coil end group. The minor segments also include jumper segments 236 for providing irregular pitch and/or irregular radial distance connections as shown in FIG. 11.

FIG. 2 shows a unit of regular segments in a first slot and a second slot which is spaced apart a magnetic pole pitch in a clockwise direction from the first slot. A conductor 231a in the inner most layer of the first slot makes a pair with a conductor 231b in the outer most layer of the second slot. Likewise, a conductor 232a in the inner middle layer of the first slot makes a pair with a conductor 232b in the outer middle layer of the second slot.

The conductors 231a and 231b are connected via a turn portion 231c and inclined portions 231f by using a continuous wire. The conductors 232a and 232b are connected via a turn portion 232c and inclined portions 232f by using a continuous wire. The turn portion 231c surrounds the turn portion 232c on a first end of the stator core 22. The turn portion 231c and the inclined portions 231f provide an end layer coil end. The turn portion 232c and the inclined portions 232f provide a middle layer coil end. In this embodiment, the turn portions 231c and 232c and the inclined portions 231f and 232f provide first coil end portions. The end and the middle layer coil ends mainly form a first coil end group 23a on the first end of the stator core 22. The first coil end group 23a provides a sufficient cooling surface on which the cooling wind generated by the fan 12 flows.

The conductor 232a in the inner middle layer of the first slot makes a pair with a conductor (not shown, but disposed in the same slot where the conductor 231b is located) in the inner most layer of the second slot. Likewise, a conductor 231b' in the outer most layer of the first slot makes a pair with the conductor 232b in the outer middle layer of the second slot. The conductors 232a and the conductor (not shown) are connected via an inner joining portion 233a and inclined portions 231g' and 232g. The conductors 231b' and 232b are connected via an outer joining portion 233b and inclined portions 231g' and 232g.

The joining portions 233a and 233b are provided by joining a pair of short axially extending tabs 231d, 231d', 232d, 232e, 231e' and 231e by welding, ultrasonic welding, arc welding, brazing or the like. The inner joining portion 233a and the inclined portions 231g' and 232g provide an inner coil end. The outer joining portion 233b and the inclined portions 231g' and 232g provide an outer coil end. Therefore, a plurality of the inner coil ends and the outer coil ends are arranged circumferentially in two rows on a second end of the stator core 22. The inner and outer coil ends provide a second coil end group 23b on the second end of the stator core 22. In this embodiment, the inner and outer joining portions 233a and 233b and the inclined portions 231g, 231g', 232g and 232g' provide second coil end portions. The second coil end group 23b provides a sufficient cooling surface on which the cooling wind generated by the fan 11 flows.

Figure 4:
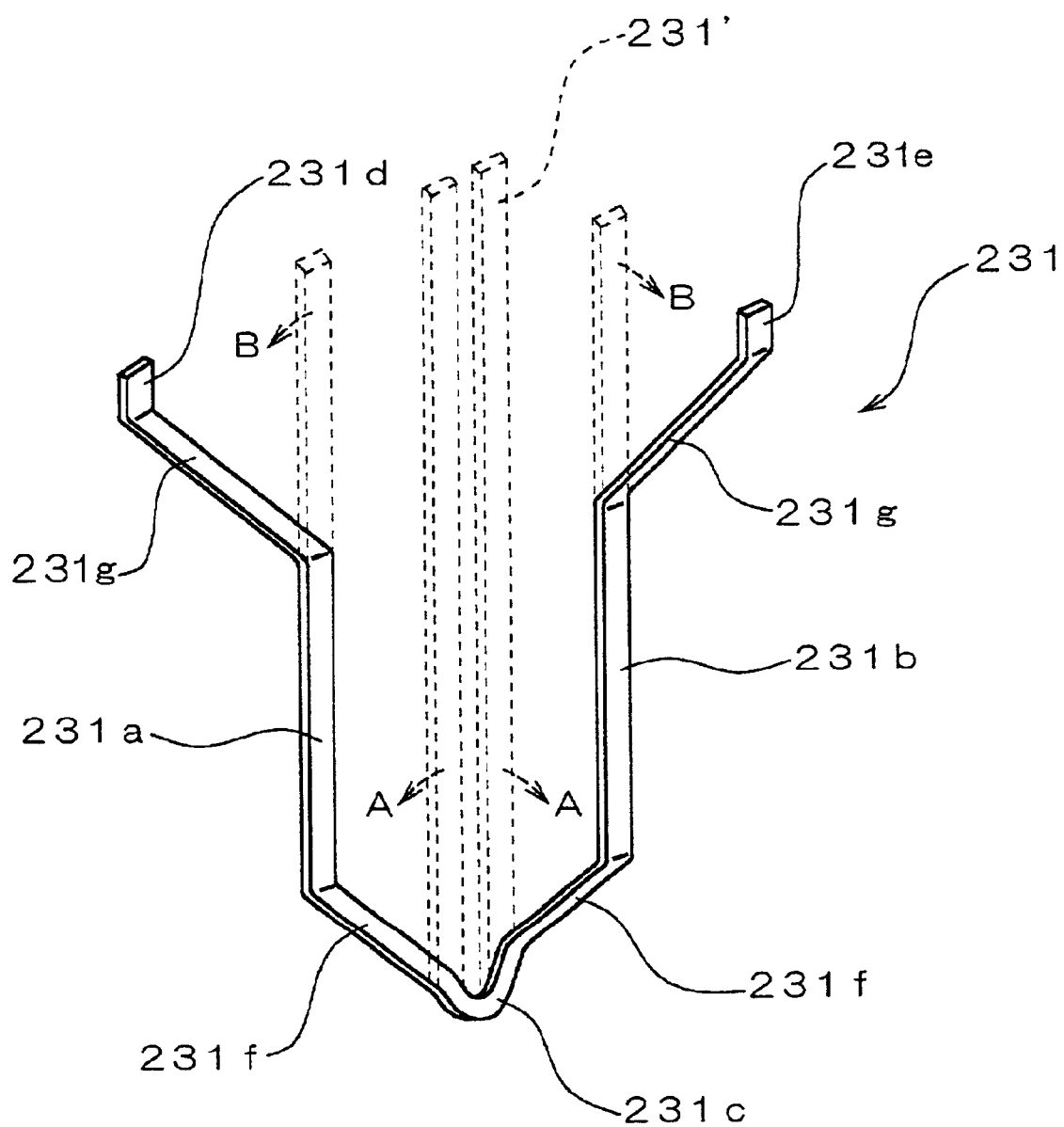
FIG. 4 is a perspective view showing bending processes of the segment according to the first embodiment of the present invention.

The segments 230 are made of a flat cross-section copper wire with an insulating layer. The segments 230 are formed by bending and/or pressing the wires into required shapes. For instance, the U-shaped large segments 231 is made of the following steps. First, a flat cross-section wire is bent into a narrow U-shape 231' that has a turn portion 231c as shown in FIG. 4 by the broken line. Next, inclined portions 231f and 231f are formed by widening both portions in opposite directions indicated by arrows A. Then, the segments 230 are inserted from one end of the stator core 22 into the insulator 24 previously inserted into the slots 25 as shown in FIGS. 3 and 11. As a result, the slots 25 define straight portions as conductors 231a and 231b. Portions extending from the other end of the stator core 22 are bent, e.g. in directions indicated by arrows B, to provide inclined portions 231g and 231g and tabs 231d and 231e. Referring to FIG. 11, end portions of the irregular segments 234, 235 and 236 are bent to form inclined portions and tabs similar to the showing in FIG. 2. These portions provide fourth coil end portions in the second coil end group 23B.

Referring to FIG. 6, the three-phase winding 23A has three output terminals and a neutral connection. Each of the phase windings X, Y and Z has two winding sections, e.g. X1 and X2, which are made of the regular segments 231 and 232. Each of the phase windings X, Y and Z has the irregular segment 236 for providing a connection between the winding sections and the irregular segments 234 and 235 for providing the output terminal and the neutral connection.

The segments 230 are arranged on the stator 2 so as to dispose the output leads and the neutral connections on the first end. Referring to FIGS. 7, 8, 9 and 10, the output leads Xb, Yb, Zb, Ub, Vb and Wb and the neutral connections N1 and N2 are arranged on the first coil end group 23a and are disposed on a cooling air passage.

For instance, the X-phase winding has a winding section X1 and a winding section X2, which are shifted 180 degrees electric angle. The winding section X1 travels around the stator core 22 so that the ends of the winding section X1 are located on the 40th slot and the 34th slot. The winding section X2 travels around the stator core 22 so that the ends of the winding section X2 are located on the 40th slot and the 34th slot. The winding sections X1 and X2 are connected via a jumper connection Xa which is provided by the irregular segment 236 in the 40th and 34th slots. The other end of the winding section X1 is connected to the output lead Xb which is the irregular segment 234 in the 40th slot. The other end of the winding section X2 is connected to a neutral lead Xc for providing the neutral connection N1 which is the irregular segment 235 in the 34th slot. The other phase windings are connected in the same manner.

Figure 9:
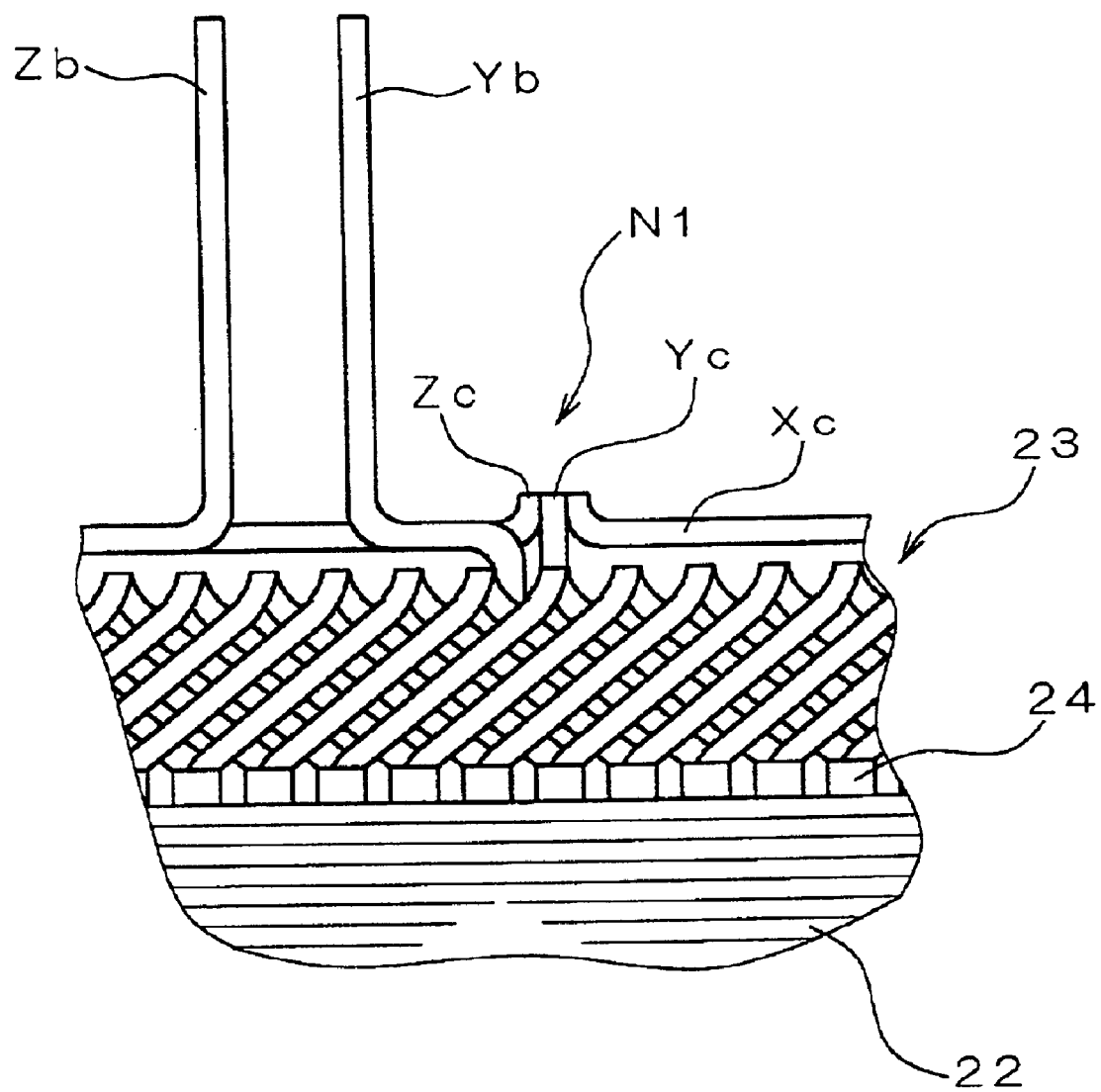
FIG. 9 is a side view of a stator viewing from an arrow IX in FIG. 8.
Figure 10:
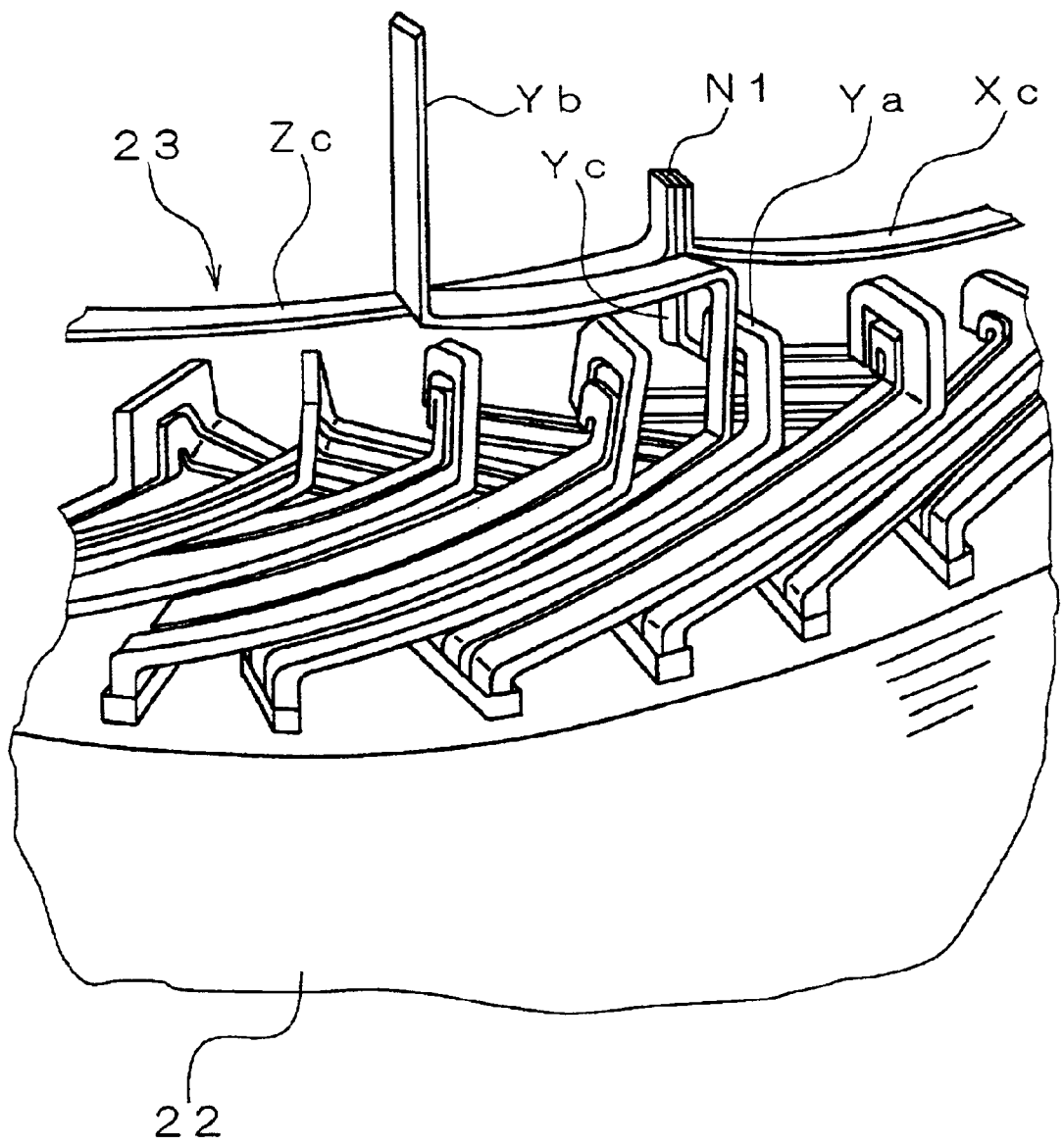
FIG. 10 is a perspective view of a stator core viewing from an arrow X in FIG. 8.

The output leads Xb, Yb, Zb, Ub, Vb and Wb are bent on an axial end of the first coil end group 23a to form crank shapes. Some of the neutral leads Xc, Yc, Zc, Uc, Vc and Wc are bent to form the neutral connections N1 and N2. Referring to FIGS. 9 and 10, the output lead Yb has two right angle bends and a portion extending along an axial end surface of the first coil end group 23a. Each of the neutral leads Xc and Zc has two right angle bends and a curved portion extending along the axial end surface of the first coil end group 23a. The other output leads and the neutral connection N2 are formed in the same manner.

In FIG. 7, a chain dashed line is the inner most layer, a broken line is the inner middle layer, a solid line is the outer middle layer and a chain double-dashed line is the outer most layer. The jumper connections Xa, Ya, Za, Ua, Va, and Wa connect the inner middle layer and the outer most layer as shown in FIGS. 7 and 11. The output lead in the outer middle layer, e.g. the output lead Xb, and the turn portion of the jumper connection, e.g. the turn portion 236c of the jumper connection Xa, must be arranged so as to avoid a collision. Therefore, it is difficult to keep a sufficient distance between the segments at the inclined portions 234f, 235f and 236f and the turn portions 236c.

In this embodiment, inclined portions 234f, 235f and 236f and turn portion 236c provide third coil end portions that are shaped different from the first coil end portions provided by the regular segments 231 and 232. The jumper connections Xa, Ya, Za, Ua, Va, and Wa and the output and neutral leads Xb, Yb, Zb, Ub, Vb, Wb, Xc, Yc, Zc, Uc, Vc, and Wc are all provided by the irregular segments.

The jumper connections, e.g. Xa, may be provided by joining a pair of I-shaped segments similar to the segments 235 and 236 instead of the U-shaped segment 236. The output leads and the neutral connections may be formed on the second coil end group 23b. Further, the inclined portions described above may be formed as a curved shape.

Figure 12:
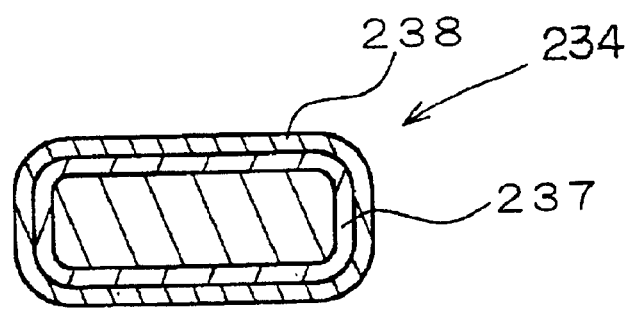
FIG. 12 is a cross-sectional view of the irregular segment according to the first embodiment of the present invention.
Figure 14:
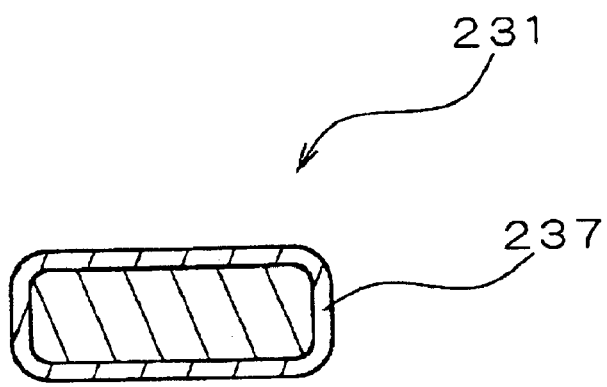
FIG. 14 is a cross-sectional view of the regular segment according to the first embodiment of the present invention.

Each of the regular segments 231 and 232 is covered with a first insulating layer which is made of a polyester-imide layer 237 as shown in FIG. 14. Each of the irregular segments 234, 235 and 236 is covered with a second insulating layer which is made of a polyester-imide layer 237 and a polyamide-imide layer 238 on the polyester-imide layer 237 as shown in FIG. 12. Both of the layers 237 and 238 are $20 \times 10^{-6}$(m) thickness. Therefore, the polyamide-imide layer 238 only covers a second surface area of the segments, which is smaller than a first surface area being covered with the polyester-imide layer 237.

The polyamide-imide layer 238 provides a higher insulation performance than the polyester-imide layer 237. The polyamide-imide layer 238 improves the insulation performance by increasing thickness. The polyamide-imide layer 238 also improves the insulation performance by improving a mechanical strength because the polyamide-imide resin has greater flexibility than the polyester-imide. The polyamide-imide layer 238 also improves the insulation performance by improving heat-resistance because the polyamide-imide resin has greater heat-resistance than the polyester-imide. Therefore, it it possible to improve an insulation relating to the irregular segments and to prevent short circuiting involving the irregular segments.

Figure 13:
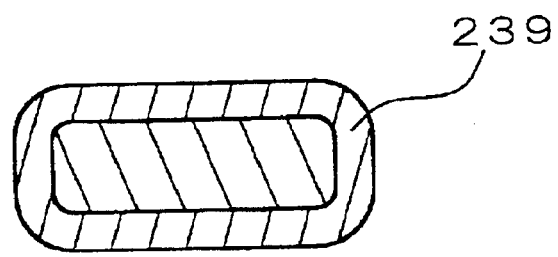
FIG. 13 is a cross-sectional view of the irregular segment according to a second embodiment of the present invention.

FIG. 13 shows a second embodiment of the present invention. In the second embodiment, the irregular segments 234, 235 and 236 have thicker insulating layers 239 than that of the regular segments 231 and 232. The thicker insulating layer 239 improves an insulation performance by decreasing pin-holes and improving wear and abrasion resistance.

The irregular segments may have only the polyamide-imide layer to provide the second insulating layer which has a higher insulation performance than the first insulating layer. The irregular segments may have the second insulating layer on specific portions only. For instance, the second insulating layer may only cover one or all of the inclined portions 234f, 235f and 236f and portions axially extended from the inclined portions 234f and 235f beyond the coil end group. Further, the second insulating layer may be applied on only surfaces of the irregular segments that face each other. Further, the second insulating layer may be applied on specific regular segments, e.g., the regular segments next to the irregular segments, to prevent a short circuit with the irregular segment. Further, the second insulating layer may be applied on only one or some of the irregular segments considering possibilities of a short circuit.

The present invention can be applied to a generator, a motor or a rotary electric machine that selectively acts as a generator and a motor. The present invention can be applied to a rotary electric machine which has only one three-phase winding.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention.

What is claimed is:

1. A rotary electric machine, comprising:
   a rotor; and
   a stator having a stator winding with a first coil end group on an axial end thereof and a second coil end group on the other axial end, the stator winding including:
   a plurality of regular segments welded to one another and regularly arranged in a pattern to provide a main portion of the stator winding and a plurality of irregular segments disposed to provide connections of the regular segments to form the stator winding and output leads, each of the regular segments having a turn portion disposed in the first coil end group and a pair of joining portions disposed in the second coil end group,
   a first insulating layer covering the regular segments, and
   a second insulating layer covering at least a portion of the irregular segments, wherein the second insulating layer has a higher insulation performance than the first insulating layer.

2. The rotary electric machine according to claim 1, wherein the irregular segment extends from the first coil end group.

3. The rotary electric machine according to claim 1, further comprising a fan, wherein the irregular segments are disposed on a passage of cooling wind generated by the fan.

4. The rotary electric machine according to claim 1, wherein the second insulating layer is made of a different material from the first insulating layer.

5. The rotary electric machine according to claim 4, wherein the first insulating layer is made of a polyester-imide and the second insulating layer is made of the polyester-imide and a polyamide-imide.

6. The rotary electric machine according to claim 4, wherein the first insulating layer is made of a polyester-imide and the second insulating layer includes a polyamide-imide.

7. The rotary electric machine according to claim 1, wherein the second insulating layer is thicker than the first insulating layer.

8. A rotary electric machine, comprising:

a frame having a rectifier disposed at an axial end, a rotor having a mixed flow cooling fan and a centrifugal cooling fan respectively disposed at opposite axial ends; and a stator having stator core and a stator winding with a first coil end group on an axial end of the stator core and a second coil end on the other axial end thereof, wherein the stator winding includes a plurality of regular segments mounted in the stator core and welded to one another in a regular pattern to provide a main portion of the stator winding and a plurality of irregular segments mounted in the stator core in different patterns to provide connections of the regular segments to form the stator winding and output leads, wherein each of the regular segments having a turn portion disposed in the first coil end group and a pair of joining portions disposed in the second coil end group, and wherein at least a portion of the irregular segments is covered with an insulating layer of higher insulation performance than another insulation layer that covers the regular segments.

9. The rotary electric machine according to claim 8, wherein the first coil-end group and said rectifier are disposed near the centrifugal cooling fan, and wherein a portion of said irregular segment extends from said first coil-end group to be connected to said rectifier.

10. The rotary electric machine according to claim 8, wherein each of the irregular segments has at least one joining portion disposed in the second coil-end group.

* * * * *